(12) United States Patent
Glugla et al.

(10) Patent No.: US 8,439,011 B2
(45) Date of Patent: *May 14, 2013

(54) METHOD AND SYSTEM FOR PRE-IGNITION CONTROL

(75) Inventors: Chris Paul Glugla, Macomb, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,771

(22) Filed: May 7, 2012

(65) Prior Publication Data

US 2012/0266847 A1 Oct. 25, 2012

Related U.S. Application Data

(63) Continuation of application No. 13/090,955, filed on Apr. 20, 2011, now Pat. No. 8,171,912.

(51) Int. Cl.
*F02M 7/23* (2006.01)
*F02D 41/30* (2006.01)

(52) U.S. Cl.
USPC ....... 123/305; 123/406.47; 123/435; 701/111

(58) Field of Classification Search ......... 123/299, 123/300, 305, 435, 406.21, 406.37, 406.39, 123/406.47; 701/103, 104, 105, 111; 73/35.07, 73/35.01, 35.12, 114.02, 114.46
See application file for complete search history.

(56) References Cited

U.S. PATENT DOCUMENTS

| | | | |
|---|---|---|---|
| 5,386,367 A | 1/1995 | Ziegler et al. |
| 6,354,264 B1 | 3/2002 | Iwakiri et al. |
| 6,543,419 B2 | 4/2003 | Okamoto et al. |
| 6,561,163 B1 | 5/2003 | Takahashi et al. |
| 6,705,277 B1 | 3/2004 | McGee |
| 6,758,201 B2 | 7/2004 | Hosoi |
| 6,769,625 B2 | 8/2004 | Peterson, Jr. |
| 7,043,350 B2 | 5/2006 | Abe et al. |
| 7,128,048 B2 | 10/2006 | Yamoaka et al. |
| 7,178,503 B1 | 2/2007 | Brehob |
| 7,219,650 B2 | 5/2007 | Nagano et al. |
| 7,303,144 B2 | 12/2007 | Alyanak |
| 7,694,666 B2 | 4/2010 | Lewis et al. |
| 7,721,710 B2 | 5/2010 | Leone et al. |
| 7,921,833 B2 | 4/2011 | Bidner et al. |

(Continued)

FOREIGN PATENT DOCUMENTS

| | | |
|---|---|---|
| JP | 404008847 A | 1/1992 |
| JP | 2010037964 A | 2/2010 |
| JP | 2010209710 A | 9/2010 |

OTHER PUBLICATIONS

Glugla, Chris P., "Method and System for Pre-Ignition Control," U.S. Appl. No. 13/070,720, filed Mar. 24, 2011, 45 pages.

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for addressing cylinder pre-ignition by adjusting a spray angle of fuel injected into a cylinder responsive to an indication of pre-ignition. A spray pattern of fuel injected in the cylinder is varied based on a cylinder pre-ignition count to reduce cylinder wall impingement of injected fuel while improving air-fuel mixing in the cylinder.

19 Claims, 4 Drawing Sheets

U.S. PATENT DOCUMENTS

| | | |
|---|---|---|
| 8,095,297 B2 | 1/2012 | Glugla et al. |
| 8,171,912 B2 * | 5/2012 | Glugla et al. ................ 123/305 |
| 2006/0243243 A1 | 11/2006 | Fukasawa |
| 2007/0119425 A1 | 5/2007 | Lewis et al. |
| 2007/0215069 A1 | 9/2007 | Leone |
| 2008/0283023 A1 | 11/2008 | Lewis et al. |
| 2010/0094528 A1 | 4/2010 | Auclair et al. |
| 2010/0185378 A1 | 7/2010 | Hillion et al. |

* cited by examiner

METHOD AND SYSTEM FOR PRE-IGNITION CONTROL

CROSS REFERENCE TO RELATED APPLICATIONS

The present application is a continuation of U.S. patent application Ser. No. 13/090,955 filed Apr. 20, 2011, the entire contents of which are incorporated herein by reference for all purposes.

FIELD

The present description relates generally to methods and systems for controlling a vehicle engine in response to pre-ignition detection.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

For example, a fuel injection timing may be adjusted (e.g., advanced) to mitigate pre-ignition. In one example, by injecting at least some of the fuel relatively early, cylinder charge cooling may be achieved, which reduces the likelihood of abnormal cylinder combustion events. However, the early injection timing can cause the injected fuel to impinge on the cylinder walls and cause wall wetting. Fuel droplets coming off the cylinder walls can in turn generate a low octane species in the combustion mixture that acts as an ignition source for cylinder pre-ignition. Consequently, the desired pre-ignition mitigation may not be achieved.

Thus in one example, at least some of the above issues may be at least partly addressed by a method of operating an engine including a fuel injector. One example embodiment comprises, adjusting a spray angle of fuel injection to a cylinder based on an indication of pre-ignition. In this way, a spray pattern can be manipulated for each engine cylinder to reduce fuel impingement on the cylinder wall, and improve charge cooling, thereby reducing the occurrence of pre-ignition in the cylinder.

In one example, an engine control system may estimate a likelihood of cylinder pre-ignition from a cylinder pre-ignition count. Based on the cylinder pre-ignition count, a cylinder may be rich or lean injected with fuel delivered over one or more injections in a given engine cycle. The number of injections and timing of each injection in the given engine cycle may be adjusted based on the cylinder pre-ignition count. In response to an earlier injection timing (e.g., an injection timing closer to BDC), an engine controller may decrease the spray angle of fuel injected by the fuel injector to reduce cylinder wall impingement. In comparison, in response to a later injection timing (e.g., an injection timing closer to TDC), the controller may increase the spray angle to increase fuel injected onto the piston head and improve air-fuel mixing. The controller may likewise adjust a spray direction (or orientation) of the fuel injector.

In this way, the spray pattern of fuel injected in a cylinder may be adjusted to provide convective cooling without increasing the likelihood of abnormal cylinder combustion events. By adjusting the spray pattern of each engine cylinder based on respective cylinder pre-ignition counts, engine pre-ignition may be reduced even if different cylinders of the engine have different likelihoods of pre-ignition. Further, by adjusting the spray angle of fuel injection, cylinder air-fuel mixing may be improved to reduce exhaust emissions and increase power output. In this way, engine degradation due to pre-ignition can be reduced while improving engine fuel economy and exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
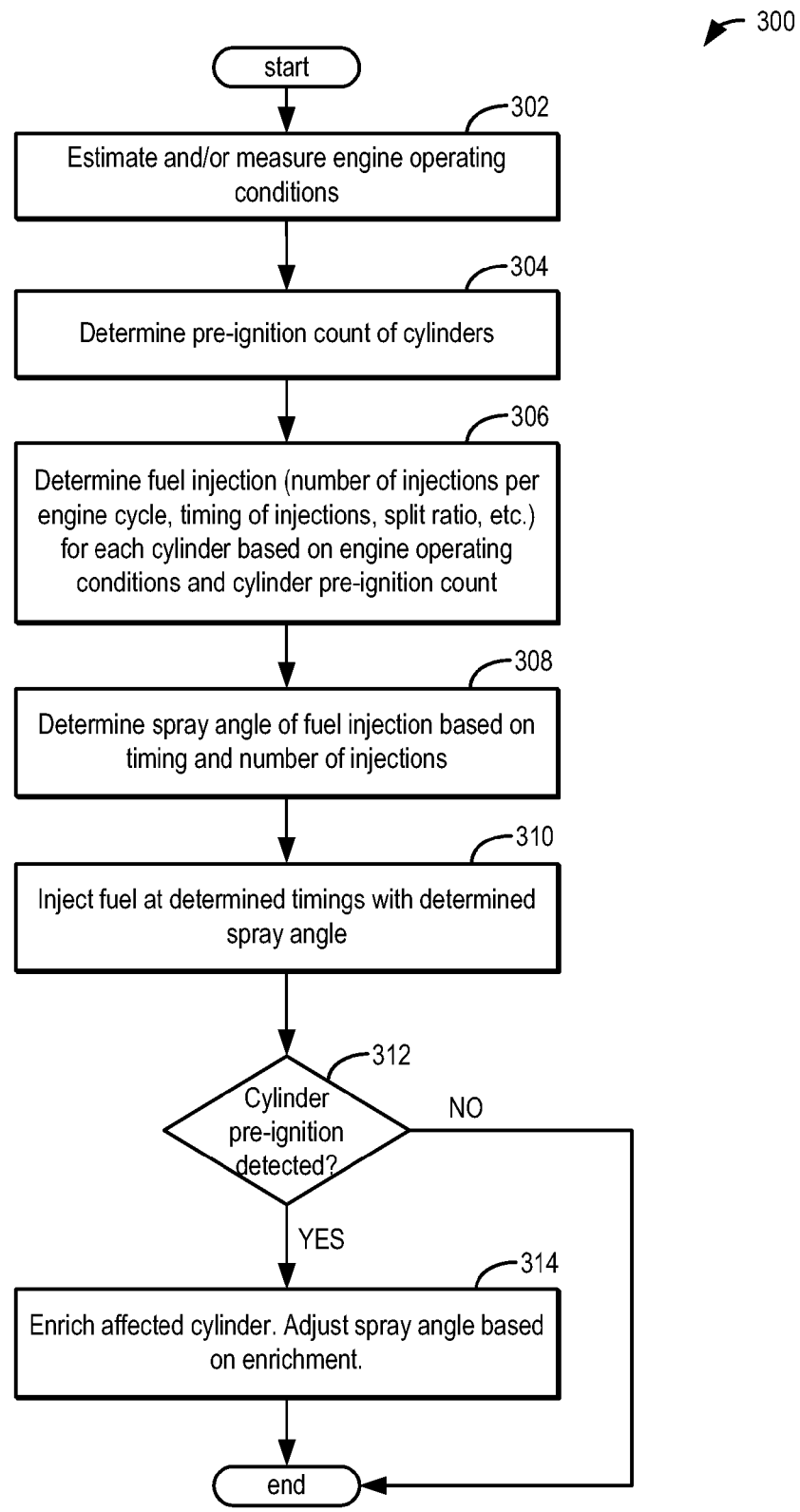
FIG. 3 shows a high level flow chart for adjusting a spray angle of a fuel injection responsive to an indication of pre-ignition.
Figure 4:
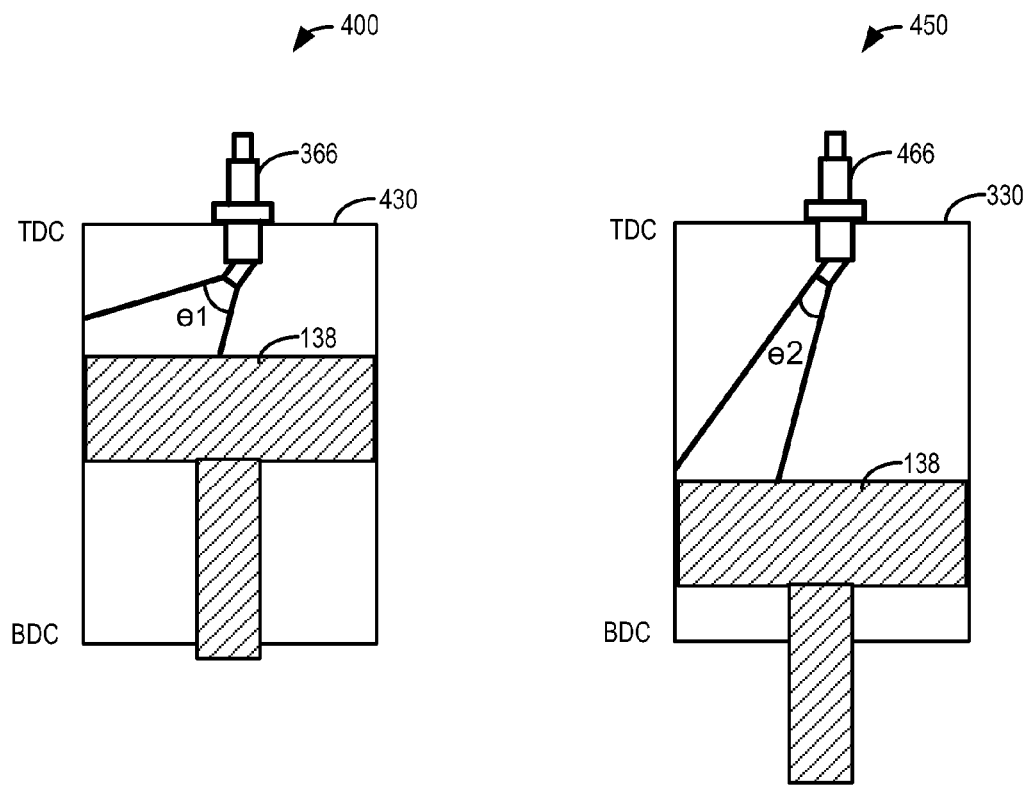
FIG. 4 shows example spray angle adjustments, according to the present disclosure.

The following description relates to systems and methods for adjusting a spray angle of fuel injected to each cylinder of an engine (such as the engine system of FIGS. 1-2) responsive to an indication of pre-ignition. Based on each engine cylinder's propensity for pre-ignition, an engine controller may inject fuel into some engine cylinders as a split injection (with multiple injections over an engine cycle), while injecting fuel into other cylinders as a single injection. The timing and number of each injection may be based on cylinder pre-ignition counts. Then, based on the timing and number of the injections, a spray angle of the injection may be adjusted to reduce cylinder wall impingement of the injected fuel. The controller may perform an example routine, as shown in FIG. 3, to adjust the injection mode, the timing and number of injections, as well as the spray angle based on the cylinder's pre-ignition history so as to reduce the occurrence of further pre-ignition. The spray angle may also be adjusted based on injector outlet geometry. Example spray angle adjustments are illustrated in FIG. 4. In this way, pre-ignition may be mitigated and engine performance may be improved.

Figure 1:
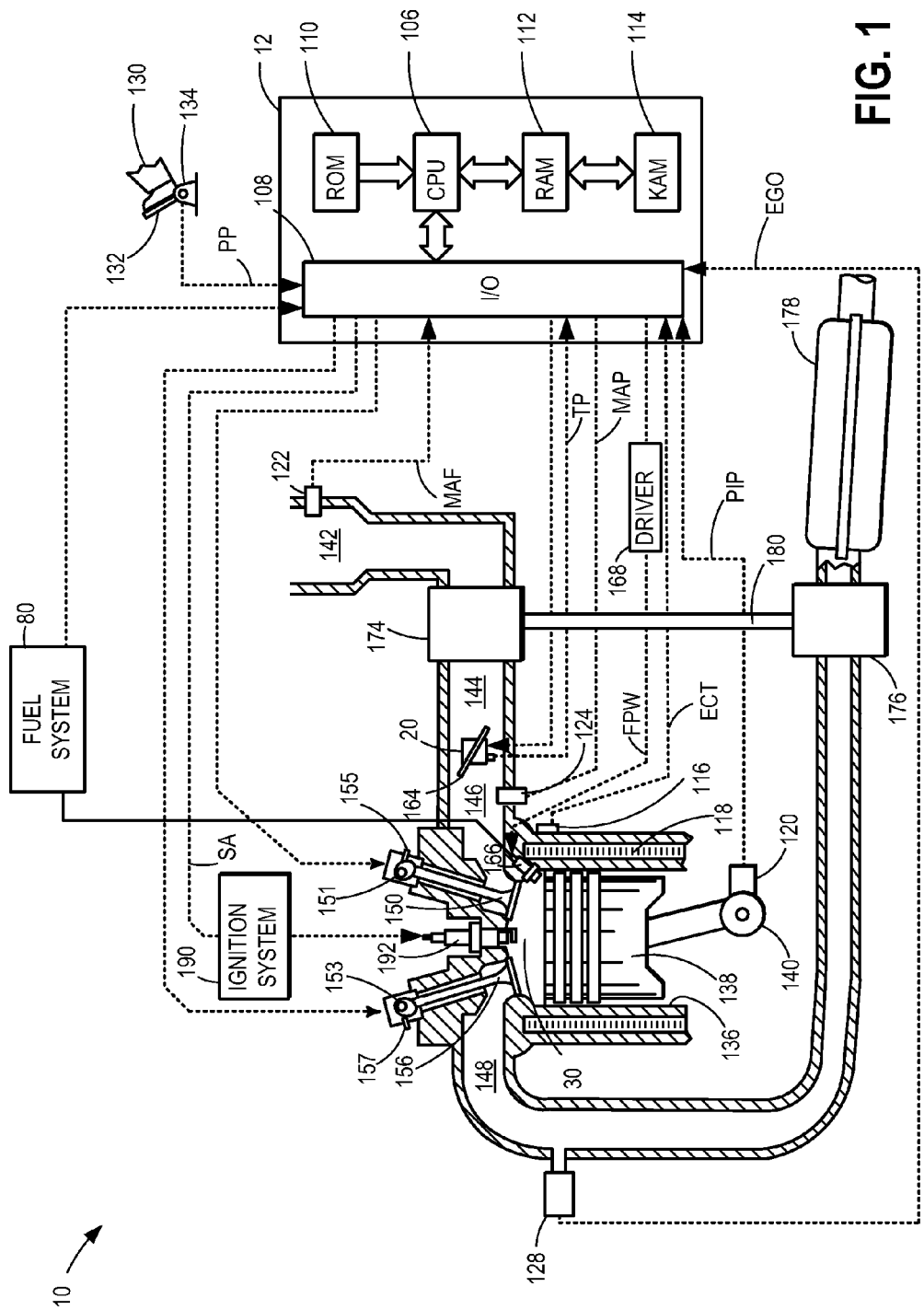
FIG. 1 is a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Figure 2A:
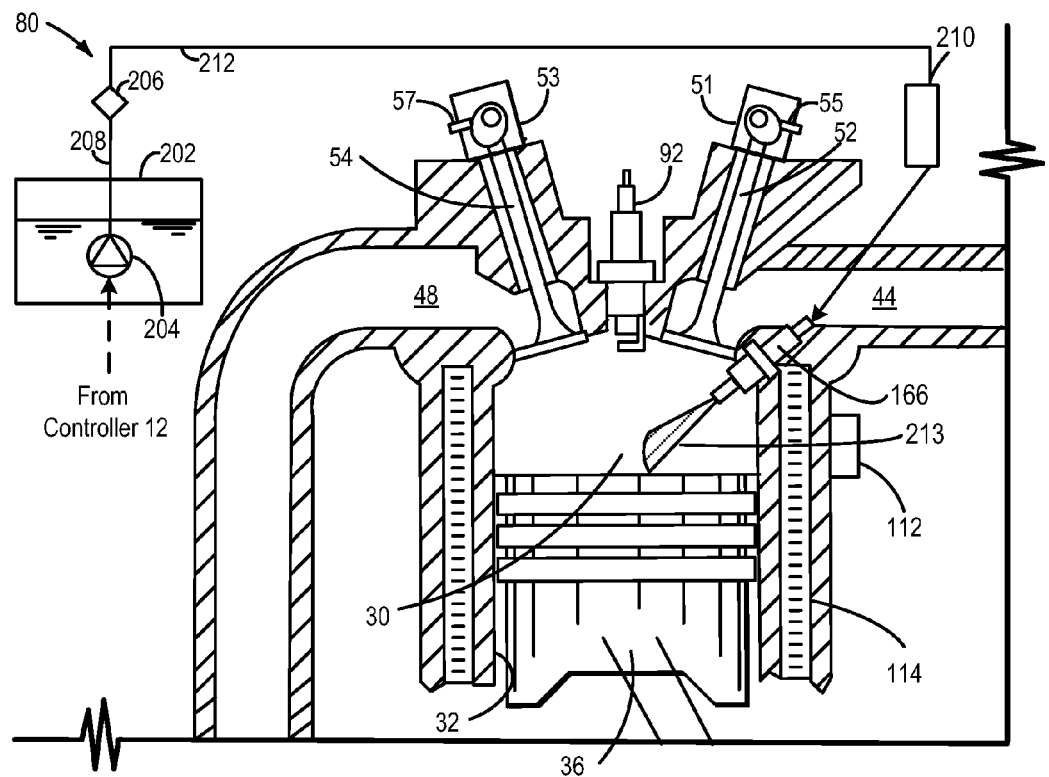
FIG. 2A illustrates a detailed view of the combustion chamber of FIG. 1 and a fuel system.

Fuel may be delivered to fuel injector 166 via a high pressure fuel system 80, including fuel tanks, fuel pumps, and a fuel rail, schematically illustrated in FIG. 2A, and discussed in greater detail herein. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc. Example fuels include E85 (which includes a mixture of approximately 85% ethanol and 15% gasoline), E10 (which includes a mixture of approximately 10% ethanol and 90% gasoline), 100% gasoline, or a variety of blends there-between. Still other fuels include methanol, diesel, hydrogen, biodiesel, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

FIG. 2A illustrates a detailed view of the combustion chamber 30 and associated fuel system 80 included in internal combustion engine 10, illustrated in FIG. 1.

Fuel system 80 may include a fuel tank 202 at least partially enclosing a pump 204. In some examples, pump 204 may be an electronically actuated lift pump. However, in other examples, pump 204 may be another suitable type of pump, such as a mechanically driven pump, a rotodynamic pump, etc. Pump 204 may be electronically coupled to controller 12, illustrated in FIG. 1. Continuing with FIG. 2A, a fuel filter 206 may be coupled to the pump via a fuel line 208. The fuel filter may be configured to remove unwanted particulates from the fuel. A fuel rail 210 may be coupled to the fuel filter via a fuel line 212. Likewise, fuel injector 166 may be coupled to the fuel rail. It will be appreciated that fuel rail 210 may be configured to deliver fuel to a plurality of direct fuel injectors included in a multi-cylinder engine. Fuel injector 166 may be configured to deliver a fuel spray 213 directly into the cylinder during certain operating conditions.

Additional or alternate components may be included in the fuel system. These may include, but are not limited, to a mechanically actuated pump (not shown) positioned downstream of the lift pump, one or more check valves (not shown) positioned downstream of the lift pump, one or more solenoid valves (not shown) coupled downstream of the lift pump, a return-less fuel circuit (not shown) fluidly coupled downstream of the lift pump and to the fuel tank, etc.

Figure 2B:
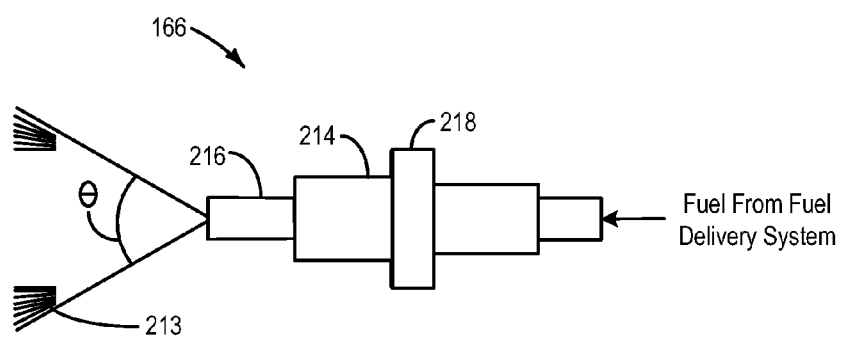
FIG. 2B illustrates a detailed view of the fuel injector of FIG. 2A.

FIG. 2B shows a detailed view of fuel injector 166. In the depicted example, the fuel injector includes a main body 214, a nozzle 216, and a valve 218. The nozzle may be configured to deliver fuel spray 213 directly into combustion chamber 30. The fuel spray has a spray angle θ. Fuel injector 166 may be configured with variable injector targeting wherein the spray angle θ and/or a direction (or orientation) of the nozzle is changed to change the area over which fuel is sprayed in the combustion chamber. That is, the injector may be manipulated to produce wide or narrow fuel dispersion.

Additionally, differences in fuel injector nozzle shapes, orifice shapes or geometry, and nozzle capacities may generate different spray patterns. In one example, nozzle 216 may be a cone nozzle generating a fuel spray in the shape of a cone, wherein spray angle θ may also be referred to as cone angle θ. Alternate nozzles having other spray patterns may also be used to deliver fuel to the combustion chamber. Examples include flat spray pattern, full cone spray pattern, hollow cone spray pattern, multi-cone spray pattern, etc.

In some embodiments, spray angle θ may be varied by changing a pressure differential across the fuel injector. For example, by decreasing the pressure differential, the spray angle may be decreased. The pressure differential across the fuel injector may be altered via adjustment of the MAP and/or the fuel rail pressure, depending on operating conditions in the vehicle, such as fuel composition, intake valve position, engine temperature, ambient temperature, injection timing, etc. Under certain operating conditions, such as when the intake valve is in an open position during fuel injection, the throttle may be adjusted to alter the MAP to adjust the spray angle θ. Alternatively, the fuel rail pressure may be adjusted via adjustment of fuel delivery system components (e.g., the lift pump and/or one or more valves) to vary spray angle θ.

The temperature of the fuel, and therefore the temperature of the fuel injector, may also affect the spray angle θ. In some embodiments, a fuel injector heating system may be used to adjust the spray angle. However, fuel injection heating systems can add component and operation costs to the engine system.

As elaborated in FIG. 3, by adjusting a spray angle responsive to an indication of pre-ignition (such as, based on a cylinder pre-ignition count), cylinder wall wetting can be reduced while providing convective cooling of a cylinder charge. By adjusting the spray pattern of fuel dispersed by a fuel injector into a combustion chamber, exhaust emissions may be lowered, power output may be increased via convective cooling, and borderline spark tolerance may be increased. As such, this enables an occurrence of cylinder pre-ignition to be reduced.

FIG. 3 depicts an example routine 300 for adjusting a spray angle of fuel injected into an engine cylinder based on an indication of pre-ignition. Herein, cylinders with a higher likelihood of pre-ignition may be operated in a split injection mode, with fuel delivered as multiple injections in an engine cycle, to reduce the possibility of cylinder pre-ignition. Further, the spray angle of each injection may be adjusted based at least on the timing of the injection. In comparison, cylinders with a lower likelihood of pre-ignition may be operated in a single injection mode with fuel delivered as a single injection in the same engine cycle, the spray angle of the single injection adjusted based at least on the timing of the single injection. By adjusting the spray angle, the spray pattern of the injection can be adjusted to reduce cylinder wall impingement of injected fuel while improving air-fuel mixing in the cylinder.

At 302, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, etc. At 304, the pre-ignition count of each cylinder may be determined. In one example, the pre-ignition count of each cylinder may be stored in a look-up table in the database of the engine controller. The look-up table may be updated at regular intervals (e.g., every engine cycle, every 50 miles, every hour, etc.), or in response to an occurrence of cylinder pre-ignition.

The pre-ignition (PI) count for each cylinder may include, for example, a cylinder trip PI count and a cylinder lifetime PI count. The cylinder trip PI count may represent a total number of pre-ignition events in the cylinder over the present trip, or engine cycle. The cylinder lifetime PI count may represent the total number of pre-ignition events in the cylinder over the lifetime of engine operation. Further, individual cylinder lifetime PI counts and trip PI counts may be used to determine an overall engine lifetime and trip PI count. As such, each cylinder's PI count may represent the given cylinder's pre-ignition history, and may correlate with each cylinder's propensity for further pre-ignition events.

At 306, a fuel injection for each cylinder may be determined based on engine operating conditions and the cylinder pre-ignition count. Specifically, the routine includes adjusting a timing and number of injections of the fuel injection, in a single engine cycle, based on the pre-ignition count and engine operating conditions. Additionally, a split ratio of the injection (that is, a ratio of the amount of fuel in each injection of a multiple injection) may be adjusted based on the pre-ignition count.

As such, under otherwise identical engine operating conditions, the incidence of pre-ignition in different cylinders may vary due to differences in manufacturing, as well as due to differences in compression ratio, effective heat rejection, fuel injection, etc. For at least some of the same reasons, the incidence of knocking may also vary between cylinders. Cylinders with a higher occurrence of pre-ignition and knocking may degrade earlier due to higher combustion pressures experienced therein. Thus, by adjusting the timing and number of injections, in a single engine cycle, of a fuel injection to each cylinder of an engine based on a pre-ignition count of the cylinder, a high incidence of abnormal combustion events in a given cylinder may be reduced, and cylinder degradation due to pre-ignition may be curbed.

Adjusting the number of injections of the fuel injection, in a single engine cycle, includes increasing a number of injections in the same engine cycle as the cylinder pre-ignition count increases above a threshold. In one example, the engine may include a first cylinder with a first, higher pre-ignition count (e.g., higher than a threshold) and a second cylinder with a second, lower pre-ignition count (e.g., lower than a threshold). Fuel may be injected in the first cylinder as a split injection, that is, as multiple injections in an engine cycle. In comparison, fuel may be injected in the second cylinder as a single injection in the engine cycle. In another example, both cylinders may receive a split injection with fuel injected in the first cylinder over a larger number of injections in the engine cycle and fuel injected in the second cylinder as a smaller number of injections in the engine cycle. In both examples, the number of injections and timing of each injection in the first cylinder may be based on the first pre-ignition count while the number of injections and timing of each injection in the second cylinder is based on the second pre-ignition count.

In yet another example, fuel may be split injected in the first cylinder to enrich the first cylinder while fuel is single injected in the second cylinder to enlean the second cylinder. The enrichment of the first cylinder (e.g., duration of enrichment, amount of enrichment, etc.) may be adjusted based on the first pre-ignition count while the enleanment of the second cylinder (e.g., duration of enleanment, amount of enleanment, etc.) is adjusted based on the second pre-ignition count. The enrichment and enleanment may be adjusted to maintain an overall exhaust air-to-fuel at or around stoichiometry. By providing the fuel injection as multiple injections over an engine cycle, rather than as a single injection, the pre-ignition mitigating effect of the fuel injection may be improved and the likelihood of pre-ignition in the cylinder may be reduced.

Adjusting a timing of the fuel injection includes adjusting the timing of each injection into a pre-ignition reducing injection timing. As such, the pre-ignition reducing injection timing, or timing window, may be based on the cylinder pre-ignition count. In particular, the window may correspond to a timing range within which fuel may be injected in the cylinder to reduce the likelihood of further pre-ignition. If the current injection timing (e.g., the average injection timing of the multiple injections) is advanced relative to the pre-ignition reducing injection timing, the timing of one or more of the multiple injections may be retarded to bring the injection timing within the desired timing window. In comparison, if the current injection timing is retarded relative to the pre-ignition reducing injection timing, the timing of one or more of the multiple injections may be advanced to bring the injection timing within the desired timing window. As such, adjusting the timing may include adjusting a start of injection timing, an end of injection timing, an average injection timing, and a duration between the multiple injections. In another example, as the number of multiple injections in a given engine cycle is increased, a timing of each of the multiple injections may be adjusted such that the average injection timing is maintained the same as for a corresponding single injection.

Adjusting a split ratio of the fuel injection may include adjusting the amount of fuel injected in each of the multiple injections (e.g., symmetrically distributed or asymmetrically distributed). In one example, the split ratio of the multiple injections may be adjusted such that the first injection is rich while the later injections are lean or stoichiometric. In another example, the split ratio of the multiple injections may be adjusted such that each injection is equally rich or lean. Additionally or optionally, the timings of one or more of the multiple injections may be adjusted, based at least on the number of injections as well as the split ratio of the injections, so that the average injection timing is retarded or advanced relative to the corresponding single injection. For example, if a smaller amount of fuel is injected in the first injection (e.g., lower than a threshold amount), the injection timing may be advanced. Herein, the small amount of fuel injected early in the engine cycle may provide cylinder cooling effects that can reduce the likelihood of abnormal combustion events. In comparison, if a larger amount of fuel is injected in the first injection (e.g., higher than the threshold amount), the injection timing may be retarded. Herein, the larger amount of fuel injected later in the engine cycle may reduce cylinder wall impingement of fuel.

A proportion of fuel that is direct injected to the cylinder relative to the proportion of fuel that is port injected to the cylinder may also be adjusted based on the cylinder's pre-ignition count. For example, the proportion of a split rich injection that is direct injected may be increased as the cylinder pre-ignition count increases above the threshold while the remaining portion is provided as port injection. Further still, to factor in charge cooling properties of the injected fuel, and their effect on abnormal cylinder combustion events, the timing and number of injections for the split injection may be further adjusted based on an alcohol content of the injected fuel.

In some embodiments, the fuel injector may be further configured to inject a diluent (e.g., water, methanol, a combination thereof, etc.) into the cylinder. When a diluent is available for injection, the timing and number of injections for the split injection may be further adjusted based on the octane content of the diluent. For example, the number of injections may be increased as the alcohol content of the injected fuel, and/or the octane content of the diluent, increases. Likewise, the injection timing may be further adjusted (e.g., advanced or retarded) to take advantage of the cooling properties of the fuel and/or diluent. A timing, distribution, and number of injections of the diluent may also be adjusted based on the cylinder pre-ignition count. For example, diluent injection may be scheduled in a closed loop response to pre-ignition, in an open loop or feed-forward response to pre-ignition, or other adaptive fashion. This allows the diluent injection to be coordinated with the fuel injection, and synergistic charge cooling benefits to be achieved.

At 308, the spray angle of the fuel injection is adjusted based at least on the timing and number of injections. Adjusting the spray angle includes decreasing the spray angle when the timing of a fuel injection is closer to BDC, and increasing the spray angle when the timing of a fuel injection is closer to TDC. By decreasing the spray angle when the timing of the fuel injection is closer to BDC, particularly in the case of relatively early injection timings, the portion of injected fuel that impinges on the cylinder wall may be reduced while allowing the convective charge cooling properties of the early injection to be availed. By increasing the spray angle when the timing of the fuel injection is closer to TDC, air-fuel mixing in the cylinder (particularly at the piston head) can be improved, thereby improving power output. Example spray angle adjustments are shown with reference to FIG. 4.

The spray angle may also be adjusted based on an outlet geometry of the injector. For example, the spray angle may be varied based on the orifice size, orifice shape, nozzle shape, etc. of the injector. It will be appreciated that in addition to the spray angle, a spray direction of the injection may also be adjusted based on the indication of pre-ignition.

In one example, multiple spray pattern injectors may be used, and the spray pattern and/or angle may be adjusted by selecting different orifices under different conditions. As an example, the injectors may be piezo-electrically actuated injectors wherein a duty cycle of the injector may be varied to adjust a position (e.g., height) of the injector pintle. Herein, the height of the pintle may determine the flow path, and hence the set of injector orifices that are used during the injection (with different sets of orifices generating different spray patterns and/or angles).

The spray angle may be further adjusted based on an alcohol content of the injected fuel. For example, the spray angle may be decreased as the alcohol content of the fuel increases. Under some engine operating conditions, such as during cold starts, wall wetting of the combustion chamber and/or the intake manifold may be exacerbated when a fuel having a higher alcohol concentration is utilized in the fuel delivery system. Herein, the increased wall wetting caused by the alcohol may be mitigated by decreasing the spray angle. In particular, during engine starting, when the engine may be operated with some valve overlap, by decreasing the spray angle, fuel loss during valve overlap and wear on engine components may be decreased. Likewise, the spray angle may be further adjusted based on an octane content of the injected diluent. In one example, the spray angle may be decreased as the octane content of the injected diluent increases.

In some embodiments, the spray angle may be further adjusted based on the ratio of direct injected fuel to port injected fuel. As previously elaborated, a portion of the fuel injection to the cylinder may be direct injected while a remaining portion is port injected, with a ratio of direct injected fuel relative to port injected fuel increased as the cylinder pre-ignition count increases above the threshold. Herein, as the proportion of fuel that is direct injected increases, the spray angle may be decreased to take advantage of the charge cooling effect of the direct injection.

In one embodiment, the fuel injection adjustments may be performed on a cylinder-by-cylinder basis for each cylinder of the engine to bring a pre-ignition count of each cylinder closer to each other, such as to a common pre-ignition count, while maintaining an exhaust air-to-fuel ratio at or around stoichiometry. In one example, the common pre-ignition count may be a weighted average of the pre-ignition count of all the cylinders of the engine. Alternatively, the common pre-ignition count may be an alternate statistical function (e.g., mean, mode, median, etc.) of the pre-ignition counts of all the cylinders. The fuel injection adjustments may be based on the number of engine cylinders with a pre-ignition count above the common pre-ignition count, a number of cylinders with a pre-ignition count below the common pre-ignition count, as well as a deviation of each cylinder from the common pre-ignition count.

At 310, fuel may be injected into the engine cylinders as per the determined number of injections per engine cycle, at the determined timings, and with the determined spray angle. Torque disturbances arising from the adjustments to the cylinder fuel injection may be compensated for using corresponding ignition spark timing adjustments (e.g., using spark retard).

In one example, fuel may be injected into a first cylinder with a first, higher pre-ignition count at a first spray angle, the first spray angle based on the first pre-ignition count. At the same time, fuel may be injected into a second cylinder with a second, lower pre-ignition count at a second, different spray angle, the second spray angle based on the second pre-ignition count. Fuel injection to the first cylinder and fuel injection to the second cylinder may be adjusted to bring the first and second pre-ignition counts to a common pre-ignition count while maintaining an exhaust air-to-fuel ratio at or around stoichiometry. In this way, fuel may be injected into each cylinder with a different spray pattern based on each cylinder's propensity for pre-ignition to reduce a high occurrence of pre-ignition in any given cylinder.

At 312, it may be determined if a cylinder pre-ignition event has occurred. If yes, then at 314, in response to the occurrence of a cylinder pre-ignition event, the cylinder pre-ignition count of the affected cylinder may be increased, the cylinder may be enriched for a duration, and the spray angle of the fuel injection may be further adjusted based on the enrichment.

In one example, in response to the occurrence of pre-ignition, the number of multiple injections in a split injection may be increased. Herein, by providing the enrichment as a larger number of injections, pre-ignition mitigation may be improved. As another example, the timing of the multiple injections in the split rich injection may be adjusted to further advance or retard the injection timing and/or to increase a duration between the multiple injections. As yet another example, the split ratio of the multiple injections may be adjusted to increase the enrichment of the first injection relative to the later injections (for example, by increasing the duration or amount of the first injection). Alternatively, the enrichment of each of the multiple injections may be increased. The injection distribution may also be adjusted with a larger proportion of fuel being direct injected as compared to the proportion that is port injected. In one example, substantially all of the rich fuel injection may be delivered via a direct injector. Further still, the injection of alternate higher octane fuels, and/or diluents may be adjusted (e.g., number of injections may be increased, a duration of each injection may be increased, an amount of fuel or diluent injected may be increased, etc.) to provide convective cylinder air charge cooling that may lower the pre-ignition propensity.

In another example, in response to pre-ignition occurring while a cylinder is operating with single fuel injection, cylinder operation may be shifted from a single injection mode to a split injection mode to improve the pre-ignition mitigating effect of the injected fuel. Herein, by providing the fuel injection amount as a split injection rather than a single injection, pre-ignition may be mitigated.

In this way, by adjusting a timing and number of injections to each cylinder, as well as a spray angle of fuel injection, based on the cylinder's pre-ignition count, pre-ignition mitigating factors can be used to balance and compensate for pre-ignition contributing factors. For example, air and fuel based pre-ignition mitigation and convective charge cooling effects can be used to offset cylinder wall impingement of fuel and smoke generation. In other words, an injection schedule can be adjusted based on engine operating conditions to trade-off some attributes in order to take advantage of other attributes, thereby reducing an overall pre-ignition tendency of the engine.

Example spray angle adjustments are now described with reference to FIG. 4. Specifically, FIG. 4 shows a first example 400 and a second example 450 of a spray angle adjustment, the spray angles determined as per the routine of FIG. 3. As such, the examples of FIG. 4 may reflect a fuel injection being performed during an intake stroke of the cylinder.

First example 400 depicts a first engine cylinder 330 with a first, higher pre-ignition count, and a first fuel injector 366 configured to inject fuel and/or diluent into the first cylinder. Second example 450 depicts a second engine cylinder 430 with a second, lower pre-ignition count and a second fuel injector 466 configured to inject fuel and/or diluents into the second cylinder. An engine controller may split inject fuel into the first cylinder to enrich first cylinder 330. A timing and number of injections of the split injection may be based on the first pre-ignition count. The controller may also single inject fuel into the second cylinder to enlean the second cylinder 430. A timing and number of injections of the single injection may be based on the second pre-ignition count. In the depicted example, a timing of at least one of the injections of the split injection (e.g., the first of the multiple injections) may be advanced such that the injection occurs when a piston 338 is closer to BDC rather than TDC. By using at least one relatively early injection, cylinder charge cooling can be achieved. In comparison, the timing of the single injection may occur when a piston 438 is closer to TDC rather than BDC.

The controller may adjust a first spray angle θ1 of the first fuel injector 366 based on the split injection while adjusting the second spray angle θ2 of the second fuel injector 466 based on the single injection. Herein, in response to the timing of the split injection in the first cylinder 330 approaching TDC, the first spray angle θ1 is increased. That is, for the earlier intake stroke injection, a wider spray pattern may be used. In this way, air-fuel mixing in the cylinder can be improved near the piston head. In comparison, in response to the timing of the single injection in the second cylinder 430 approaching BDC, the second spray angle θ2 is decreased. That is, for the later intake stroke injection, a narrower spray pattern may be used. Further, the narrower spray pattern may be directed towards a bowl on the top of the piston, such that it concentrates into a relatively richer mixture (as compared to the wider spray pattern injection) in the vicinity of the spark plug. This allows for improved ignition as well as facilitating the combustion of the relatively leaner remaining charge. By decreasing the spray angle, an amount of fuel that impinges on the cylinder wall and causes cylinder wall wetting may be reduced. Consequently, an amount of fuel that may come off the cylinder walls during a cylinder combustion event is reduced, lowering the risk of the impinged fuel acting as an ignition source for a future cylinder pre-ignition event.

In this way, by adjusting a spray angle of fuel injected in a cylinder responsive to an indication of pre-ignition, the spray pattern in the cylinder may be varied to mitigate pre-ignition. In particular, by varying the spray pattern in the cylinder, convective charge cooling effects of an early fuel injection may be used to reduce the likelihood of pre-ignition. At the same time, the spray angle may be adjusted to reduce cylinder wall impingement of the injected fuel and improve cylinder air-fuel mixing. In this way, engine degradation due to pre-ignition can be reduced while improving engine fuel economy and exhaust emissions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine including a fuel injector, comprising,
  direct injecting fuel from the fuel injector into a cylinder of the engine; and
  adjusting a spray angle of the injected fuel based on an indication of pre-ignition.

2. The method of claim 1, wherein the indication of pre-ignition includes a pre-ignition count of the cylinder, the method further comprising, adjusting a timing and number of injections of the fuel injection to the cylinder, in a single engine cycle, based on the pre-ignition count, wherein the adjusting the spray angle of the fuel injection is based on the timing and number of injections.

3. The method of claim 2, wherein adjusting the spray angle includes decreasing the spray angle when the timing of the fuel injection is closer to bottom dead center and increasing the spray angle when the timing of the fuel injection is closer to top dead center.

4. The method of claim 3, wherein adjusting the timing and number of injections includes increasing the number of injections in the engine cycle as the pre-ignition count increases above a threshold, and adjusting a timing of each injection into a pre-ignition reducing injection timing, the pre-ignition reducing injection timing based on the pre-ignition count of the cylinder.

5. The method of claim 4, wherein the spray angle is further adjusted based on an alcohol content of the injected fuel.

6. The method of claim 5, wherein the fuel injector is configured to inject a diluent into the cylinder, and wherein the spray angle is further adjusted based on an octane content of the injected diluent.

7. The method of claim 1, wherein the spray angle is further adjusted based on an outlet geometry of the fuel injector.

8. The method of claim 1, wherein the adjusting is performed on a cylinder-by-cylinder basis for each cylinder of the engine to bring a pre-ignition count of each cylinder to a common pre-ignition count while maintaining an exhaust air-to-fuel ratio at or around stoichiometry.

9. The method of claim 1, further comprising, in response to an occurrence of cylinder pre-ignition, increasing a pre-ignition count of the cylinder, enriching the cylinder for a duration, and further adjusting the spray angle based on the enrichment.

10. The method of claim 1, wherein the fuel injector has a cone nozzle, and wherein adjusting the spray angle includes adjusting a cone angle of the fuel injection.

11. The method of claim 1, further comprising, adjusting a spray direction based on the indication of pre-ignition.

12. A method, comprising:
    operating an engine including a first cylinder with a first higher pre-ignition count and a second cylinder with a second, lower pre-ignition count;
    direct injecting fuel in the first cylinder at a first spray angle during an engine cycle based on the first pre-ignition count; and
    direct injecting fuel in the engine cycle in the second cylinder at a second, different spray angle based on the second pre-ignition count.

13. The method of claim 12, wherein injecting fuel in the first cylinder includes injecting fuel over a larger number of injections in the engine cycle, the number of injections and timing of each injection in the first cylinder based on the first pre-ignition count, and wherein injecting fuel in the second cylinder includes injecting fuel over a smaller number of injections in the engine cycle, the number of injections and timing of each injection in the second cylinder based on the second pre-ignition count.

14. The method of claim 13, wherein the fuel injection to the first cylinder and the fuel injection to the second cylinder are adjusted to bring the first and second pre-ignition counts to a common pre-ignition count while maintaining an exhaust air-to-fuel ratio at or around stoichiometry.

15. The method of claim 13, further comprising, adjusting the first spray angle and not the second spray angle in response to an occurrence of pre-ignition in the first cylinder and adjusting the second spray angle and not the first spray angle in response to an occurrence of pre-ignition in the second cylinder.

16. A method of operating an engine including a fuel injector, comprising,
    direct injecting fuel from the fuel injector into a cylinder of the engine;
    adjusting a spray angle of the injected fuel based on an indication of pre-ignition; and
    in response to an occurrence of cylinder pre-ignition, increasing a pre-ignition count of the cylinder, enriching the cylinder, and further adjusting the spray angle based on the enrichment.

17. The method of claim 16 further comprising adjusting a timing and number of injections of the fuel injection to the cylinder, in a single engine cycle, based on the pre-ignition count, and adjusting the spray angle of the fuel injection based on the timing and number of injections.

18. The method of claim 16, wherein the spray angle is further adjusted based on an outlet geometry of the fuel injector.

19. The method of claim 16, wherein the adjusting is performed on a cylinder-by-cylinder basis for each cylinder of the engine to bring a pre-ignition count of each cylinder to a common pre-ignition count while maintaining an exhaust air-to-fuel ratio at or around stoichiometry.

* * * * *